US 8,898,437 B2

(12) United States Patent
Smith et al.

(10) Patent No.: US 8,898,437 B2
(45) Date of Patent: Nov. 25, 2014

(54) PREDECODE REPAIR CACHE FOR INSTRUCTIONS THAT CROSS AN INSTRUCTION CACHE LINE

(75) Inventors: Rodney Wayne Smith, Raleigh, NC (US); Brian Michael Stempel, Raleigh, NC (US); David John Mandzak, Cary, NC (US); James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1276 days.

(21) Appl. No.: 11/934,108

(22) Filed: Nov. 2, 2007

(65) Prior Publication Data

US 2009/0119485 A1     May 7, 2009

(51) Int. Cl.
  *G06F 9/30*    (2006.01)
  *G06F 9/38*    (2006.01)
(52) U.S. Cl.
  CPC ............ *G06F 9/30152* (2013.01); *G06F 9/382* (2013.01); *G06F 9/3816* (2013.01)
  USPC ........................................................ 712/213
(58) Field of Classification Search
  None
  See application file for complete search history.

(56) References Cited

U.S. PATENT DOCUMENTS

| | | | | |
|---|---|---|---|---|
| 5,918,062 A | * | 6/1999 | Oberman et al. | 712/7 |
| 5,951,671 A | * | 9/1999 | Green | 712/23 |
| 5,987,235 A | * | 11/1999 | Tran | 712/210 |
| 6,092,182 A | * | 7/2000 | Mahalingaiah | 712/213 |
| 6,460,132 B1 | * | 10/2002 | Miller | 712/213 |
| 6,502,185 B1 | | 12/2002 | Keller et al. | |
| 2002/0083301 A1 | * | 6/2002 | Jourdan et al. | 712/204 |
| 2006/0200686 A1 | * | 9/2006 | Stempel et al. | 713/300 |

FOREIGN PATENT DOCUMENTS

| | | |
|---|---|---|
| CN | 1894660 A | 1/2007 |
| EP | 0498654 | 8/1992 |
| JP | 60020255 A | 2/1985 |
| JP | 63245745 A | 10/1988 |
| JP | 04255995 | 9/1992 |
| JP | 04257948 | 9/1992 |
| JP | 6020255 A | 1/1994 |
| WO | 2007016393 | 2/2007 |

OTHER PUBLICATIONS

International Search Report—PCT/US08/081951, International Search Authority—European Patent Office—Dec. 30, 2008.
Written Opinion—PCT/US08/081951, International Search Authority—European Patent Office—Dec. 30, 2008.

* cited by examiner

*Primary Examiner* — Jacob A Petranek
(74) *Attorney, Agent, or Firm* — Peter Michael Kamarchik; Nicholas J. Pauley; Joseph Agusta (57) ABSTRACT

A predecode repair cache is described in a processor capable of fetching and executing variable length instructions having instructions of at least two lengths which may be mixed in a program. An instruction cache is operable to store in an instruction cache line instructions having at least a first length and a second length, the second length longer than the first length. A predecoder is operable to predecode instructions fetched from the instruction cache that have invalid predecode information to form repaired predecode information. A predecode repair cache is operable to store the repaired predecode information associated with instructions of the second length that span across two cache lines in the instruction cache. Methods for filling the predecode repair cache and for executing an instruction that spans across two cache lines are also described.

21 Claims, 7 Drawing Sheets

PREDECODE REPAIR CACHE FOR INSTRUCTIONS THAT CROSS AN INSTRUCTION CACHE LINE

BACKGROUND OF THE INVENTION

1. Field of the Invention

The present invention relates generally to techniques to improve efficiency in a processor which processes instructions having a variety of lengths, and, more particularly, to advantageous techniques for storing predecode information in a predecode repair cache for instructions that span across two or more cache lines.

2. Relevant Background

Many processors support instruction sets having variable length instructions. For example, a processor's instruction set may consist of 32-bit instructions and 16-bit instructions. A processor may also have a hierarchical memory configuration with multi-levels of caches including an instruction cache, a data cache, and system memory, for example. If the processor also has a deep execution pipeline that operates at a high clock rate with short duration pipeline stages, it is also likely that the processor has a predecode stage to preprocess the instructions in order to simplify a subsequent decode stage and, thus, streamline the pipeline. The predecode pipeline stage is commonly operative during an instruction cache miss to partially decode instructions that are fetched due to the instruction miss. The predecode information is written into the instruction cache along with the fetched instructions.

In a variable length instruction processor, the instructions fetched due to a miss may be of varying length and the longer instructions may span across two cache lines. For instructions that span across two cache lines, both portions of the instruction must be fetched in order to properly predecode the instruction which increases the complexity of the predecode function and may impact performance and power utilization.

SUMMARY OF THE DISCLOSURE

Among its several aspects, the present invention recognizes that performance can be improved and power conserved by using a predecode repair cache. A first embodiment of the invention recognizes that a need exists for a method of filling a predecode repair cache. A first portion of an instruction stored in a first cache line is fetched. A second portion of the instruction stored on a next cache line is also fetched. The first and the second portions of the instruction are predecoded in a processor pipeline stage to form repaired predecode information. The repaired predecode information is written in the predecode repair cache utilizing an address associated with the instruction.

Another embodiment of the invention addresses a method for executing an instruction that spans across two cache lines. A first portion of an instruction that spans across two cache lines is fetched, the first portion of the instruction stored in a first cache line in an instruction cache. Predecode information associated with the instruction is fetched from a predecode repair cache that is separate from the instruction cache. A second portion of the instruction stored in a next cache line following the first cache line is also fetched. The instruction is executed in response to the predecode information.

A further embodiment addresses an apparatus for utilizing a predecode repair cache. An instruction cache is operable to store instructions having at least a first length and a second length in an instruction cache line, the second length being longer than the first length. A predecoder is operable to predecode instructions fetched from the instruction cache that have invalid predecode information to form repaired predecode information. A predecode repair cache is operable to store the repaired predecode information associated with instructions of the second length that span across two cache lines in the instruction cache.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be written in a high level programming language such as C, C++, JAVA®, Smalltalk, JavaScript®, Visual Basic®, TSQL, Perl, or in various other programming languages. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
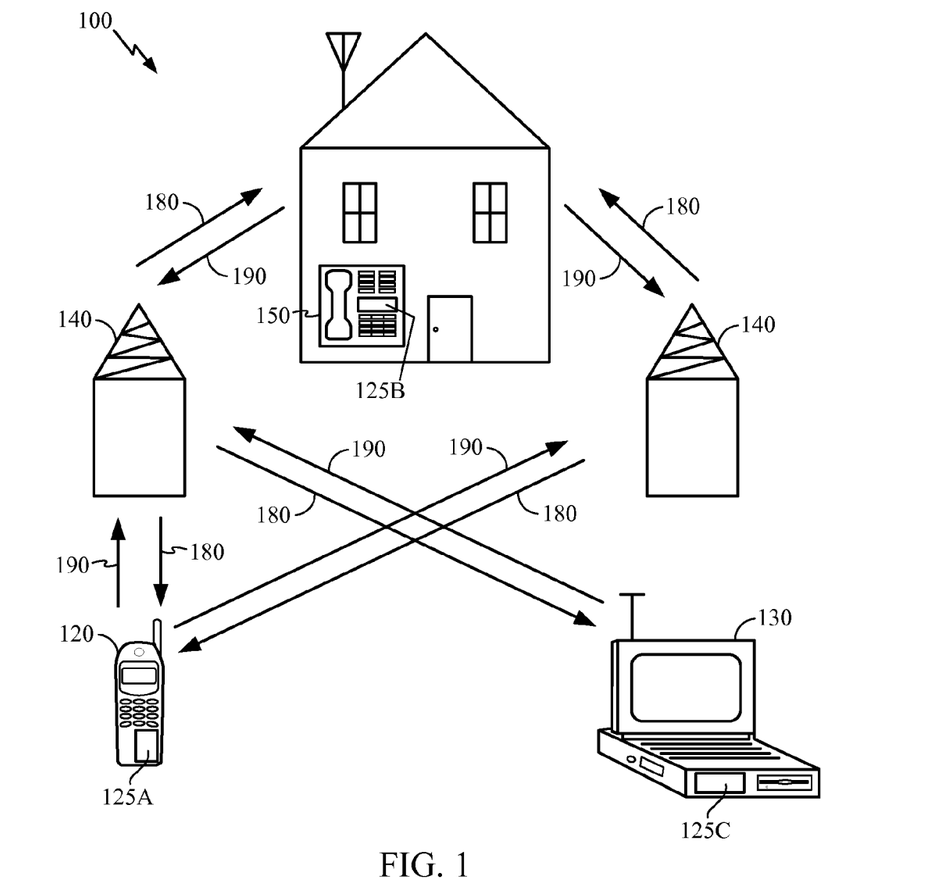
FIG. 1 illustrates of an exemplary wireless communication system in which an embodiment of the invention may be advantageously employed.

FIG. 1 illustrates of an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, and 150 include hardware components, software components, or both as represented by components 125A, 125B, and 125C, which have been adapted to embody the invention as discussed further below. FIG. 1 shows forward link signals 180 from the base stations 140 and the remote units 120, 130, and 150 and reverse link signals 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, hand-held personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device using a pipelined processor having variable length instructions which stores predecode information in an instruction cache.

Figure 2:
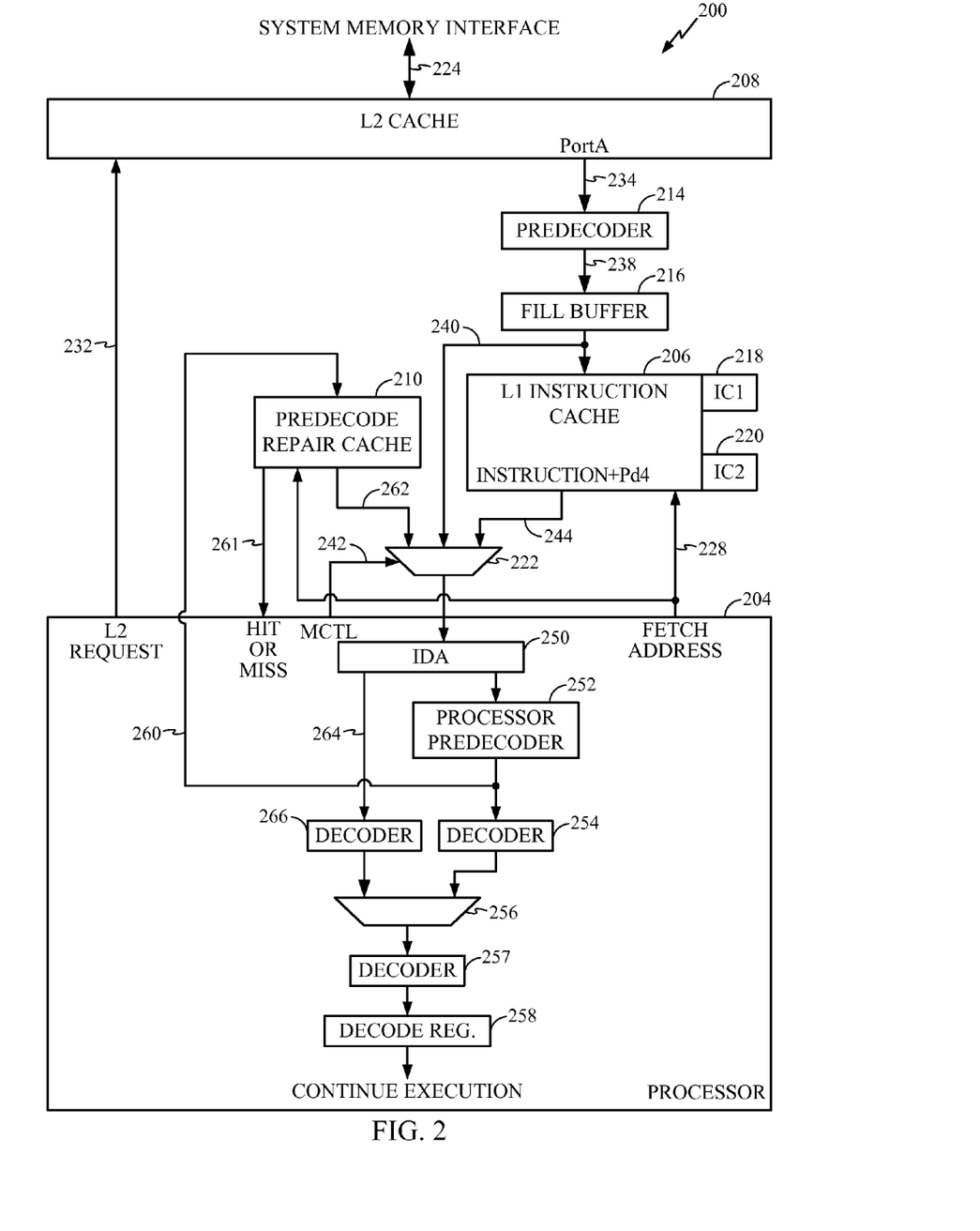
FIG. 2 illustrates instruction flow logic having a processor, a level 1 instruction cache (L1 Icache), a level 2 cache (L2 cache), and a predecode repair cache.

FIG. 2 illustrates instruction flow logic 200 having a processor 204, a level 1 instruction cache (L1 Icache) 206, a level 2 cache (L2 cache) 208, and a predecode repair cache 210. The instruction flow logic 200 further includes a predecoder 214, a fill buffer 216, instruction cache stage 1 (IC1) 218, instruction cache stage 2 (IC2) 220, multiplexer 222, and an interface to system memory 224. Peripheral devices, such as, a communication subsystem, for example, which may be connected to the processor 204, are not shown for clarity of illustration and discussion of the present invention. The instruction flow logic 200 may be suitably employed in hardware components 125A-C for executing program code. The processor 204 is directly coupled to the L1 Icache 206, and the multiplexer 222. The processor 204 fetches instructions from the caches and system memory in a hierarchical fashion. For example, the processor 204 fetches an instruction by generating a fetch address on L1 Icache input bus 228. The processor 204 may also provide an operating mode state signal to the instruction flow logic 200 as an indicator of the programmer specified mode of operation of the processor.

The processor's instruction set includes instructions encoded in multiple length formats, where longer instructions are commonly a multiple of the shortest instruction format length available in the variable length instruction set. Since an instruction may have a complex encoding that may vary depending upon the length of the instruction and the instruction may be adjacent to instructions of different lengths, the alignment and decoding of a fetched instruction may require processing beyond what is capable in a single processor pipeline stage with a short duration clock period. Due to the level of instruction complexity, the processor may include a separate instruction alignment pipeline stage and may separate instruction decode operations into a predecode step and one or more decode pipeline stages, as described in more detail below.

The predecode step may be suitably hidden from normal pipeline execution by doing a predecode operation during the processing of an L1 Icache miss. L1 Icache miss processing occurs when a fetched instruction is not found in the L1 Icache and must be fetched from higher levels of the memory hierarchy. Upon receiving the fetched instruction, for example from the L2 cache 208, the fetched instruction is predecoded. The predecode operation stores predecode information along with the fetched instruction in the L1 instruction cache. Due to the variable length instructions, an instruction may be of a length that causes the instruction to be stored across instruction cache lines. For example, a 32-bit instruction may be split into two portions, with a first 16-bit portion stored at the end of a first instruction cache line and a second 16-bit portion stored at the beginning of the next sequential instruction cache line. When an instruction spans across a cache line boundary, the complexity of the predecode operation increases as discussed in more detail below.

In operation, the processor 204 accesses the L1 Icache 206 to determine if an addressed instruction is present in the L1 Icache by use of a match mechanism. If no match is found for the fetched instruction in the L1 Icache 206, a miss occurs. The processor 206 then makes an access request 232 to the L2 cache 208. For example, on initialization of the L1 Icache 206, the Icache is treated as having invalid contents and there will be misses as the L1 Icache 206 is filling with instructions. Also, when a program branches to a new section of code, there is a greater chance for an Icache miss occurring on an L1 Icache fetch.

With an instruction hit in the L2 cache 208, an L2 cache line containing the desired instruction is output on portA 234 to the predecoder 214. The predecoder 214 operates during a predecode pipeline stage in the processing pipeline that controls the sequence of steps followed on a miss. The predecoder 214 partially decodes the instructions fetched from the L2 cache and provides instructions, predecode bits associated with the instructions, and tag information on output bus 238 that is coupled to the fill buffer 216. The fill buffer 216 provides an elastic storage to adapt to varying storage and processor latencies. The output bus 240 of the fill buffer 216 couples the buffered instructions, associated predecode bits, and tag information to the L1 Icache 206 and to the multiplexer 222 from which the instructions proceed to the processor 204 when selected by multiplexer control (Mct1) signal 242.

On an instruction hit in the L1 Icache 206, the fetched instruction and predecode bits are coupled over instruction bus 244 to the multiplexer 222 from which the instructions and predecode bits proceed to the processor 204 when selected by Mct1 signal 242. The predecode bits may be formatted in multiple ways to support efficient processing. For example, four predecode bits (Pd4) may be provided with each 16-bits instruction and two sets of Pd4 bits may be provided with each 32-bit instruction. Depending upon the information needed to be stored in the predecode bits, 2-bits, 3-bits, or more than 3-bits may be predecoded and stored in the L1 Icache line along with the associated instruction.

Figure 3A:
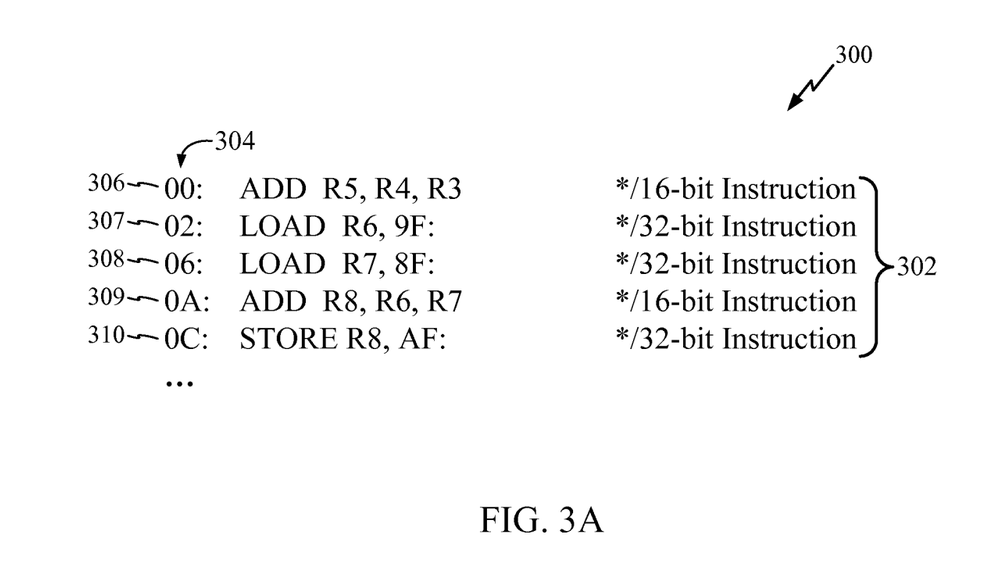
FIG. 3A illustrates an exemplary program segment containing varying length instructions of 16 and 32 bits.

FIG. 3A illustrates an exemplary program segment 300 that may suitably contain varying length instructions of 16 and 32 bits. The exemplary program segment 300 may suitably be stored in the memory hierarchy of the instruction flow logic 200, including the L1 Icache 206 and the L2 cache 208. It should be noted that although for illustration purposes the program segment is assumed to be retrieved from one or more cache lines, the teachings of the invention are applicable to any memory device storing the program segment where a variable length instruction may span a storage segment boundary. In general, the term cache line may also be referred to as an instruction string or an instruction stream. Since a cache line may have a fixed length, the terms instruction string or instruction stream refer to one or more program segments which may span the boundary of a cache line and may have instructions which are split across the boundary.

The program segment 300 includes instructions 302 which come from a variable length instruction set consisting of 16-bit and 32-bit instructions. For example, processor 204 may use 16-bit and 32-bit instruction formats for multiple types of instructions and may support several modes of operation that specify and restrict instruction type usage. For example, processor 204 may have a first mode of operation that specifies only 32-bit instructions may be used and a second mode of operation that specifies that a combination of 16-bit and 32-bit instructions may be used. While processors may have multiple modes of operation, for the purposes of clarity of discussion of the present invention, the description of the exemplary processor 204 is primarily limited to the second mode of operation described above.

In order to illustrate various embodiments, several exemplary 16-bit and 32-bit instructions are illustrated in FIG. 3A. For purposes of illustration, program relative byte indicators 304 represent the byte location in a cache line where an instruction begins and indirectly indicate the size of the instruction. For example, the ADD R5, R4, R3 instruction 306 begins at relative byte position 00 and ends at byte position 01. Thus, ADD R5, R4, R3 instruction 306 is a 16-bit instruction. Similarly, the ADD instruction 309 is also 16 bits long. The load (LOAD) instruction 307, the LOAD instruction 308, and the store (STORE) instruction 310 are 32-bits long.

A cache line size may vary in different processor implementations depending, for example, upon choices made in the design of the processor and memory hierarchy based on the fabrication technology used. The L2 cache 208 may use a 256-bit or a 512-bit cache line and the L1 cache 206 may use a smaller cache line, such as a 128-bit cache line, for example. It is noted that for illustrative purposes, the program segment 300 has been shown starting at the relative address 00. It will be appreciated, that such a program segment 300 may be located beginning at various points in a cache line and may span between multiple cache lines.

Figure 3B:
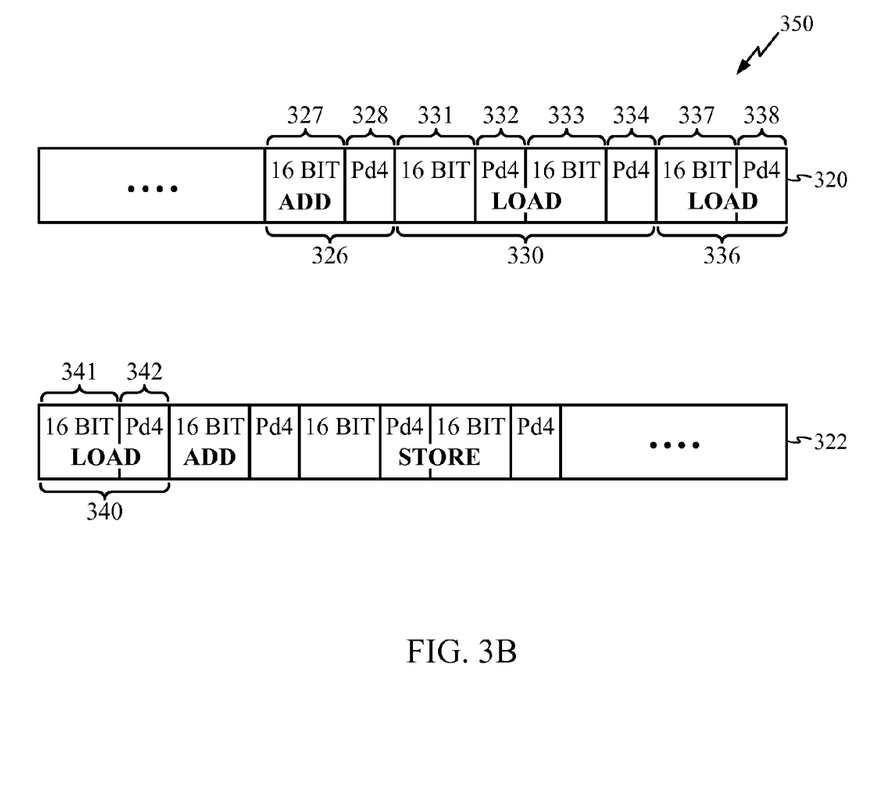
FIG. 3B illustrates exemplary L1 Icache lines containing instructions from the program segment 300 of FIG. 3A.

FIG. 3B illustrates exemplary L1 Icache lines 350 containing instructions from the program segment 300 of FIG. 3A. An exemplary first L1 Icache line 320 and an exemplary second L1 Icache line 322 are adjacent cache lines in the L1 Icache 206 of FIG. 2. The first L1 Icache line 320 consists of multiple 20-bit fields, for example, with each 20-bit field, such as 20-bit field 326, made up of a 16-bit field 327 with an associated 4-bit predecode (Pd4) field 328. In this example, the L1 cache utilizes 128-bits for instructions and also requires an additional space for eight Pd4 fields resulting in a 160-bit L1 cache line. A single 4-bit Pd4 field is used for 16-bit instructions and two Pd4 fields are used for 32-bit instructions. The 4-bit Pd4 field may contain up to sixteen encoded characteristics of the instruction or section of instruction associated with the Pd4 field. For example, the encoding may indicate whether the instruction is a load or store instruction, an arithmetic instruction, or a complex instruction requiring microcode support. The encoding may also indicate whether the associated set of 16 instruction bits is the first-half of a 32-bit instruction or a separate 16-bit instruction, whether the instruction is a branch type of instruction, or the like. The encoding may further indicate that valid predecode information is not obtainable and Pd4 bits are marked accordingly. The Pd4 information is useful in instruction alignment, decoding, and may be used for other purposes, such as branch handling, for example.

The instructions of program segment 300 of FIG. 3A may be located in the L1 cache line beginning with the 16-bit ADD R5, R4, R3 instruction 306 of FIG. 3A and its associated Pd4 field stored in L1 cache line segments 327 and 328, respectively. The 32-bit LOAD instruction 307 of FIG. 3A and its associated Pd4 fields are organized as segment 330 and stored differently than a single 16-bit instruction in the L1 cache line. For illustrative purposes, the 16-bit L1 cache line segment 331 contains the high order 16-bits of the LOAD instruction 307. The Pd4 field 332 provides predecode information for the 32-bit LOAD instruction while the next 16-bit L1 cache line segment 333 contains the low order 16-bits of the LOAD instruction 307. The Pd4 field 334 contains additional predecode information for the 32-bit LOAD instruction 307. Since other program segments may occupy the cache line at different times, the Pd4 field 334 may be used in support of a 16-bit instruction that is stored, for example, in the 16-bit L1 cache line segment 333.

The next instruction in the L1 cache line is a 32-bit LOAD instruction 308 of FIG. 3A which is stored across two instruction cache lines. The high order 16-bits of the LOAD instruction 308 along with its associated predecode bit field are stored as a 20-bit segment 336 in the first L1 Icache line 320 as made up of a 16-bit field 337 and a 4-bit Pd4 field 338. The low order 16-bits of the LOAD instruction 308 along with its associated Pd4 bit field are stored as a 20-bit segment 340 in the second L1 Icache line 322, as made up of a 16-bit field 341 and a 4-bit Pd4 field 342. The ADD R8, R6, R7 instruction 309 and the STORE instruction 310, both of FIG. 3A, are stored in the second L1 Icache line 322 in similar fashion to segments 326 and 330.

It is noted that for the first mode of operation for 32-bit only instructions, all instructions are located by architectural definition on word aligned boundaries. For this first mode of operation, a program segment is made up of only 32-bit instructions (not shown) which do not cross an instruction cache line boundary.

One aspect of the present invention relates to determining predecode information on instructions that cross instruction cache line boundaries and filling a predecode repair cache. Another aspect of the invention relates to executing an instruction that spans across two cache lines to improve processor performance and save power. These and other aspects of the invention are described in further detail below.

Referring back to the instruction flow logic 200 of FIG. 2, the processor 204 initiates fetching of instructions from the L1 Icache 206 by providing an address of the instruction to be fetched, a fetch address, on the L1 Icache input bus 228, and may provide current program specified operating mode state information at the time of the fetch. The operating mode state information at the time of the fetch may include whether the processor is in the first mode of operation which uses only 32-bit instructions on word aligned boundaries, the second mode of operation which uses both 16-bit and 32-bit instructions, or other processor modes.

If a miss occurs in the L1 Icache 206, the processor 204 proceeds to fetch the instruction from the L2 cache 208, or from system memory if the instruction is not found in the L2 cache 208. After a latency due to memory access timing, instructions are provided from the system memory or from L2 cache output 234 and coupled to the predecoder 214 to generate predecode bits. The predecode four bits (Pd4) are generated by partially decoding the instruction. The 16-bit fields of the instructions and their associated Pd4 bits are written to the L1 Icache at the appropriate cache line address.

The predecoded instruction and Pd4 bits are stored in the fill buffer 216 and from there distributed to the multiplexer 222 and the L1 Icache 206. For an instruction, such as LOAD instruction 308 of FIG. 3A which spans across the L1 Icache lines 320 and 322, the Pd4 bits stored in segment 338 of FIG. 3B are set to indicate that the associated 16-bit field 337 is the high order 16-bits of a 32-bit instruction and that the LOAD instruction 308 crosses the cache line boundary. At this point, the second half of the LOAD instruction 308 is not available. Techniques which force a second fetch from the L2 cache 208 or from system memory to obtain the second half of the LOAD instruction 308 would generally be expensive to implement and impact the processor performance. Rather than forcing the fetch of the second half of the LOAD instruction, the next cache line will be fetched in natural program progression.

The high order 16-bits of the LOAD instruction 308 are loaded into an instruction alignment (IDA) pipeline stage 250. After the next instruction cache line is fetched, the low order 16-bit half of the LOAD instruction 308 is loaded into the IDA pipeline stage 250. Instructions received in the instruction alignment stage 250 are aligned and made ready for subsequent processor predecoder 252 and a decoder 254 pipeline stages. After the decoder 254, the decoded instruction is selected to pass through multiplexer 256 and may be further decoded in decoder 257 before being loaded into decode register 258 from which the instruction continues with execution. The processor predecoder 252 forms new Pd4 predecode bits as repaired predecode information for the instruction. The address of the instruction in the L1 Icache 206 and repaired predecode information are transferred over predecode repair bus 260 to the predecode repair cache 210. The address and the new PD4 bits are then stored in the predecode repair cache. In an alternative embodiment, the instruction, address, and its associated new Pd4 bits may be transferred over the predecode repair bus 260 and stored in the predecode repair cache.

On a subsequent fetch that hits on the line crosser LOAD instruction 308, the stored information, such as the instruction and new Pd4 bits, in the predecode repair cache 210 are retrieved and the new Pd4 bits are used in place of the Pd4 bits stored with the instruction from the L1 Icache 206. A hit in the predecode repair cache 210 is indicated on hit or miss signal 261. A predecode repair cache output bus 262 couples the predecode repair cache 210 to the multiplexer 222 which is coupled to the IDA stage 250. In cases where the predecode repair cache stored Pd4 bits are used, the instructions from the IDA stage 250 proceed directly on IDA bus 264 to a decoder 266 followed by a further decoding if required in decoder 257 and then to the decode register 258 bypassing the multi-cycles encountered in the processor predecoder 252. In situations where a line crosser instruction is in a program loop, significant performance can be saved by using the repaired predecode information from the predecode repair cache 210 instead of having to go through the processor predecoder 252 pipeline stage each time through the loop.

Figure 4A:
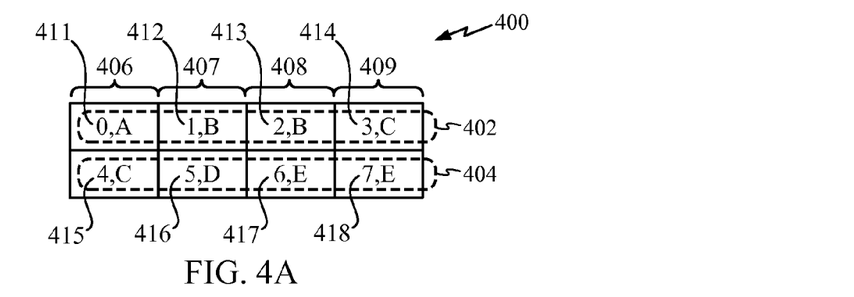
FIG. 4A illustrates an exemplary L1 Icache segment.

FIG. 4A illustrates an exemplary L1 Icache segment 400. The L1 Icache segment 400 includes a first 80-bit L1 Icache line 402 and a second 80-bit L1 Icache line 404. Each of the cache lines are made up of 20-bit sections 406-409 including a 16-bit instruction field and a Pd4 field. An exemplary program segment is stored in the cache lines 402 and 404 partitioned by 20-bit fields and labeled by the 20-bit field 0-7 and the associated 16-bit or 32-bit instructions A-E. An example program segment includes a 16-bit instruction A made up of a single 20-bit field (0,A) 411, a 32-bit instruction B made up of two 20-bit fields (1,B) 412 and (2,B) 413, a 32-bit instruction C made up of (3,C) 414 and (4,C) 415, a 16-bit instruction D (5,D) 416, and a 32-bit instruction E (6,E) 417 and (7,E) 418. The program segment stored in the L1 Icache segment 400 is similar to the program segment 300 of FIG. 3A. This program segment is used to illustrate processor pipeline stages of operation in the instruction flow logic 200 of FIG. 2. The description of pipeline stage diagrams 420 of FIGS. 4B and 450 of FIG. 4C also refer to the instruction flow logic of FIG. 2.

Figure 4B:
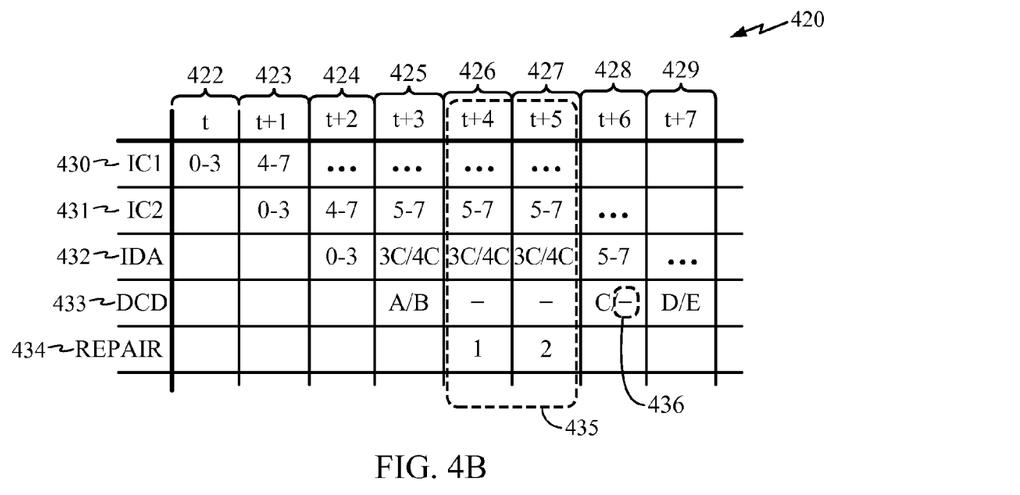
FIG. 4B illustrates a pipeline stage diagram for preparing a predecode repair cache entry.

FIG. 4B illustrates the pipeline stage diagram 420 for preparing a predecode repair cache entry. The pipeline stage diagram 420 consists of time periods "t" 422, "t+1" 423, and so on, through "t+7" 429. Pipeline stages are illustrated as rows and include an instruction cache stage 1 (IC1) 430, an instruction cache stage 2 (IC2) 431, an instruction alignment stage (IDA) 432, a decode stage (DCD) 433, and a repair stage 434.

The pipeline sequence begins at time "t" 422 with the first L1 Icache line 402, containing instruction A, (0,A) 411, instruction B, (1,B) 412 and (2,B) 413, and the first half of instruction C, (3,C) 414, entering the instruction cache stage 1 (IC1) 430, such as IC1 218 of the L1 instruction cache 206. This state is illustrated in the pipeline stage diagram 420 in row IC1 430 as 16-bit fields 0-3 at time "t" 422.

At time "t+1" 423, the first L1 Icache line 402 enters the instruction cache stage 2 (IC2) 431, such as IC2 220 of the L1 instruction cache 206. Also, at time "t+1" 423, the second L1 Icache line 404, containing the second half of instruction C, (4,C) 415, instruction D, (5,D) 416 and instruction E, (6,E) 417 and (7,E) 418, enters the IC1 430, such as IC1 218. This state is illustrated in the pipeline stage diagram 420 in row IC1 430 as 16-bit fields 4-7 at time "t+1" 423. A miss in the predecode repair cache 210 indicated by Mct1 signal 261 is also received at this time, indicating predecode bits for instruction C spanning across two cache lines have not been repaired.

At time "t+2" 424, the first L1 Icache line 402 enters the instruction alignment (IDA) pipeline stage 432, such as IDA 250 of the processor 204 through multiplexer 222. At this point, it is determined that only half of instruction C is present in the cache line. In this exemplary scenario, the second half of instruction C is in IC2 431, such as the IC2 220 stage of the pipeline. Also, instructions from the next fetched cache line are entered into the instruction cache stage 1 (IC1) 430, such as IC1 218 of the L1 instruction cache 206. These next instructions are illustrated as " . . . " to indicate that the next set of instructions are fetched.

At time "t+3" 425, instructions A and B which have valid predecode bits (Pd4) enter the decode DCD pipeline stage 433, such as by transferring to decode register 258 over IDA bus 264. This state is illustrated as A/B in the DCD 433 stage of the pipeline. The second half of instruction C is obtained from the IC2 stage 431 and combined with the first half of instruction C producing an instruction C in the IDA stage 432, 3C/4C, with invalid predecode bits. The instructions D and E made up of instruction D (5,D) 416 and instruction E (6,E) 417 and (7,E) 418 from the second L1 Icache line 404 remain at the IC2 stage 431 of the pipeline.

At time "t+4" 426, instruction C, (3,C) 414 and (4,C) 415, is predecoded in processor predecoder 252 and the results are loaded into the front end of the predecode repair cache 210. This state is illustrated as the first cycle of a predecode repair and is shown as a "1" at time "t+4" 426 and repair stage 434. The predecoder results are also made available to the decoder 254. The instruction (5,D) 416 and instruction E, (6,E) 417 and (7,E) 418, remain at the IC2 stage 431 of the pipeline.

At time "t+5" 427, the predecoder 252 results, such as valid predecode bits, are loaded into the predecode repair cache 210. This state is illustrated as the second cycle of the repair as shown as a "2" at time "t+5" 427 and repair stage 434. A decode on the instruction C is also done at this time. The instruction (5,D) 416 and instruction E, (6,E) 417 and (7,E) 418, remain at the IC2 stage 431 of the pipeline.

At time "t+6" 428, the result of the decode of instruction C is selected by multiplexer 256, may be further decoded in decoder 257, and saved in the decode register 258. Instruction (5,D) 416 and instruction E (6,E) 417 and (7,E) 418 enter the IDA stage 432, such as IDA stage 250 of processor 204.

At time "t+7" 429, instructions D and E reach the decode register 258 and continue on to execution. Since instruction C spans across two cache lines, a pipeline bubble of 2½ cycles was used to repair the predecode bits for instruction C and store the predecode bits in the predecode repair cache 210. Two of the 2½ cycles are illustrated as circled section 435 and the ½ cycle is shown as circled section 436.

Figure 4C:
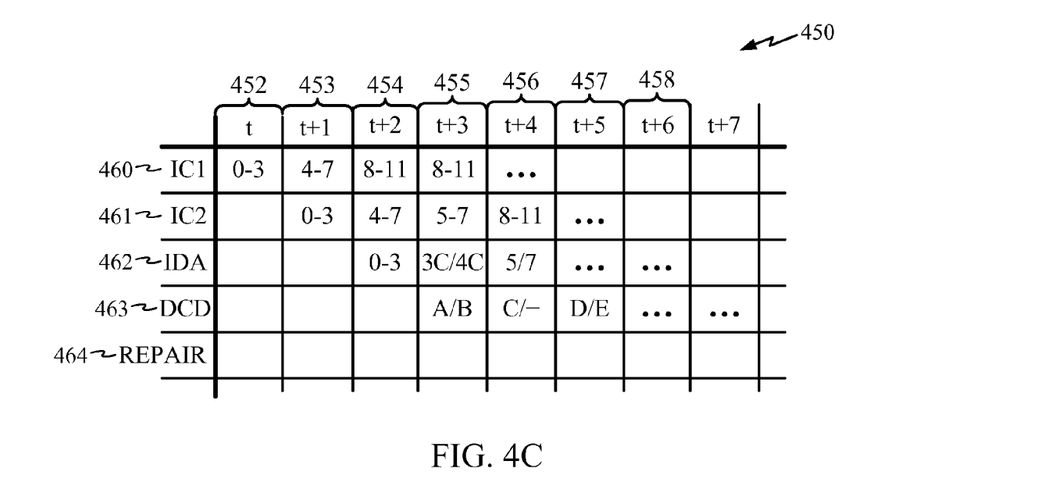
FIG. 4C is a processor pipeline stage diagram illustrating operations to save power by fetching valid predecode bits for a line crosser instruction (an instruction that spans across two cache lines) from the predecode repair cache.

FIG. 4C is a processor pipeline stage diagram 450 illustrating operations to save power by fetching valid predecode bits for a line crosser instruction from the predecode repair cache. The pipeline stage diagram 450 consists of time periods "t" 452, "t+1" 453, and so on, through "t+6" 458 and pipeline stages including an instruction cache stage 1 (IC1) 460, an instruction cache stage 2 (IC2) 461, an instruction alignment stage (IDA) 462, a decode stage (DCD) 463, and a repair stage 464.

The pipeline sequence begins at time "t" 452 with the first L1 Icache line 402, containing instructions A 411, B 412 and 413, and the first half of instruction C 414, entering the instruction cache stage 1 (IC1) 460, such as IC1 218 of the L1 instruction cache 206. This state is illustrated in the pipeline stage diagram 450 in row IC1 460 as 16-bit fields 0-3 at time "t" 452.

At time "t+1" 453, the first L1 Icache line 402 enters the instruction cache stage 2 (IC2) 461, such as IC2 220 of the L1 instruction cache 206. Also, at time "t+1" 453, the second L1 Icache line 404, containing the second half of instruction C, (4,C) 415 and instructions D (5,D) 416 and E, (6,E) 417 and (7,E) 418, enters the IC1 460, such as IC1 218. This state is illustrated in the pipeline stage diagram 450 in IC1 460 as 16-bit fields 4-7 at time "t+1" 453. A hit in the predecode repair cache 210 indicated by Mct1 signal 261 is also received, indicating to the instruction flow logic 200 that the predecode bits for instruction C spanning across cache lines have been repaired.

At time "t+2" 454, the first L1 Icache line 402 enters the instruction alignment (IDA) pipeline stage 462, such as IDA 250 of the processor 204. At this point, it is determined that only half of instruction C is present in the cache line. In this exemplary scenario, the second half of instruction C is in the IC2 461 such as IC2 220 stage of the pipeline. Since there was a hit in the predecode repair cache 210, valid predecode bits for instruction C are available. Also, instructions from the next fetched cache line are entered into the instruction cache stage 1 (IC1) 460, such as IC1 218 of the L1 instruction cache 206. These next instructions are illustrated as instructions "8-11" with a first instruction of the 8-11 group being instruction "F" which may be a 16-bit or a 32-bit instruction.

At time "t+3" 455, instructions A and B have valid predecode bits (Pd4) and enter the decode DCD pipeline stage 463, such as by transferring to decode register 258. This state is illustrated as A/B in the DCD 463 stage of the pipeline. The second half of instruction C is obtained from the IC2 stage 461, combined with the first half of instruction C, and further combined with the valid predecode bits from the predecode repair cache 210 to produce a complete instruction C in the IDA stage 462. The combining is controlled through multiplexer 222 as controlled by Mct1 signal 242 and alignment logic in IDA pipeline stage 250. For example, the repaired predecode information fetched from the predecode repair cache 210 may have a first portion, such as a first set of repaired predecode bits, and a second portion, such as a second set of repaired predecode bits. The multiplexer 222 may select the first portion and the second portion of repaired predecode bits and instruction bits from instruction C to enter the instruction alignment (IDA) pipeline stage 250. The IDA pipeline stage 250 aligns the selected bits and creates a reassembled instruction with valid aligned predecode information. The instruction D (5,D) 416 and instruction E (6,E) 417 and (7,E) 418 from the second L1 Icache line 404, remain in the IC2 stage 461 of the pipeline. The instructions 8-11 remain in the IC1 stage 460.

At time "t+4" 456, instructions C/-, made up of (3,C) 414 and (4,C) 415, enter the decode DCD pipeline stage 463, such as transferring to the decode register 258. Instructions (5,D) 416, (6,E) 417, and (7,E) 418 enter the IDA pipeline stage 462. The next instructions "8-11" enter the IC2 stage 461.

At time "t+5" 457, instruction D, (5,D) 416 and instruction E, made up of (6,E) 417 and (7,E) 418, enter the decode DCD pipeline stage 463. Processing continues with the rest of the instructions from the next instruction group "8-11" from time "t+6" 458 and continuing.

As illustrated in the processor pipeline stage diagram 450 of FIG. 4C, the 2 cycles of circled section 435 representing the pipeline bubble that occurred in the processor pipeline stage diagram 420 of FIG. 4B is avoided thereby saving power and improving performance.

Figure 5:
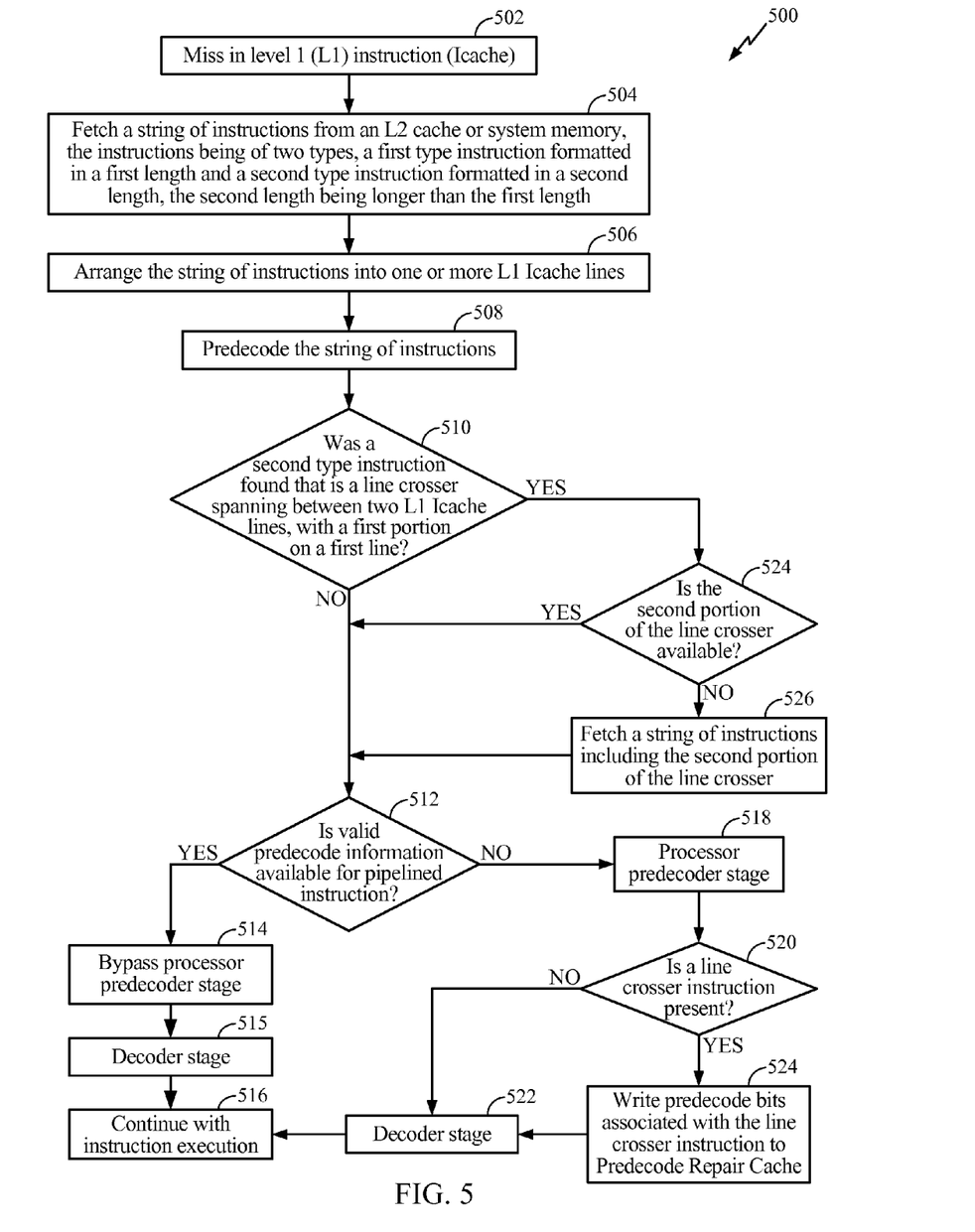
FIG. 5 is a process of operational steps that are followed on a miss in the L1 Icache and for preparing an entry to the predecode repair cache.

FIG. 5 is a process 500 of operational steps that are followed on a miss in an L1 Icache and for preparing an entry to a predecode repair cache. At block 502, a fetch to the L1 Icache results in a miss. At block 504, a processor fetches instructions from an L2 cache or system memory, where the instructions are of two types. A first type instruction is formatted in a first length, such as 16-bits, and a second type instruction is formatted in a second length. The second length, such as 32-bits, is longer than the first length. At block 506, the string of instructions are arranged into one or more L1 Icache lines. For example, a single cache line may be fetched and arranged in a cache line such as the first L1 Icache line 320 of FIG. 3B. At block 508, the string of instructions are predecoded generating predecode information for the partially decoded instructions.

At decision block 510, it is determined whether a second type instruction was found that is a line crosser instruction spanning between two L1 Icache lines with a first portion on a first line. If a line crosser instruction was not found, the process 500 proceeds to decision block 512. At decision block 512, it is determined whether valid predecode information is available for pipelined instructions. If valid predecode information is available for the pipelined instructions, the process 500 proceeds to block 514. At block 514, the processor predecoder stage is bypassed, such as by selecting IDA bus 264 thereby bypassing the multi-cycles encountered in the processor predecoder 252 of FIG. 2. At block 515, the instruction is decoded, which may include decoding in decoder 266 and decoder 257 as may be implemented. At block 516, the instruction flow logic 200 continues with instruction execution.

Returning to decision block 512. If it is determined that valid predecode information is not available for the pipelined instructions, the process 500 proceeds to block 518. Valid predecode information may be determined, for example, by examining the Pd4 bits obtained from an instruction fetched from the L1 Icache 206. The Pd4 bits may indicate, for example, that the first 16-bits of an instruction is part of a line crosser instruction and valid predecode information is not available for the line crosser instruction. At block 518, the pipelined instructions enter the processor predecoder stage, such as processor predecoder 252 of FIG. 2 which generates repaired predecode information, such as new predecode bits. At decision block 520, it is determined whether a line crosser instruction is present. If a line crosser instruction is not present, the process 500 proceeds to block 522. At block 522, the pipelined instructions enter a decoder stage, such as the decoder 254 of FIG. 2. After the decoder stage, the process 500 proceeds to block 516 to continue with instruction execution.

Returning to decision block 520, where it is determined that a line crosser instruction is present. The process 500 proceeds to block 524. At block 524, the new predecode bits associated with the line crosser instruction are written to a predecode repair cache, such as predecode repair cache 210 of FIG. 2. Then the process 500 proceeds to block 522 to provide a decode of the pipelined instruction. The process 500 then proceeds to block 516 to continue with instruction execution.

Returning to decision block 510 where it is determined that a line crosser instruction is present. At decision block 524, it is determined whether the second portion of the line crosser instruction is available. If the second portion of the line crosser instruction is available, the process 500 proceeds to decision block 512 and continues as addressed above. If it is determined at decision block 524 that the second portion of the line crosser instruction is not available, the process 500 proceeds to block 526. At block 526, a string of instructions is fetched to obtain the second portion of the line crosser instruction. For example, such a string of instructions may be fetched from the fill buffer 216 or the L1 Icache 206. The process 500 then proceeds to decision block 512 and continues as addressed above.

Figure 6:
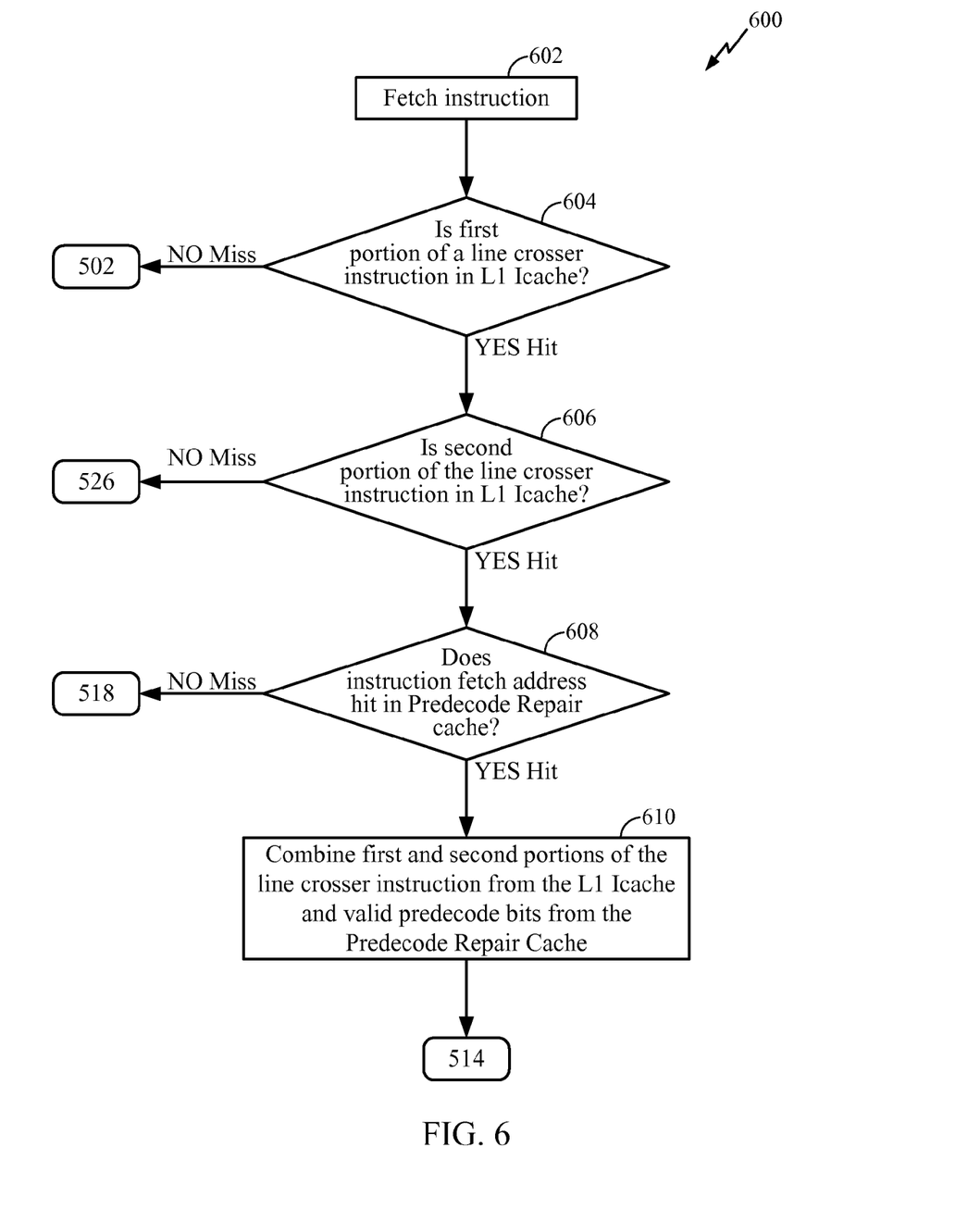
FIG. 6 is a flow chart of operational steps that are followed when a line crosser instruction is fetched from the L1 Icache.

FIG. 6 is a flow chart 600 of operational steps that are followed when a line crosser instruction is fetched from the L1 Icache. At block 602, an instruction is fetched. At decision block 604, it is determined whether a first portion of a line crosser instruction is in the L1 Icache, such as L1 Icache 206 of FIG. 2. If the first portion of the line crosser instruction is not in the L1 Icache, then a miss is recorded and the process 600 proceeds to block 502 of process 500 of FIG. 5. If the first portion of the line crosser instruction is in the L1 Icache, then a hit is recorded and the process 600 proceeds to decision block 606.

At decision block 606, it is determined whether a second portion of the line crosser instruction is in the L1 Icache. If the second portion of the line crosser instruction is not in the L1 Icache, then a miss is recorded and the process 600 proceeds to block 526 of process 500 of FIG. 5. If the second portion of the line crosser instruction is in the L1 Icache, then a hit is recorded and the process 600 proceeds to decision block 608.

At decision block 608, it is determined whether the instruction fetch address hit in the predecode repair cache, such as predecode repair cache 210 of FIG. 2. If the instruction fetch address did not hit in the predecode repair cache, then a miss is recorded and the process 600 proceeds to block 518 of process 500 of FIG. 5. If the instruction fetch address did hit in the predecode repair cache, then a hit is recorded and the process 600 proceeds to block 610. At block 610, the first and second portions of the line crosser instruction from the L1 Icache are combined with the predecode repair bits fetched from the predecode repair cache. A combiner may consist of a multiplexer, such as multiplexer 222, and alignment logic, such as may be found in IDA pipeline stage 250. The process 600 then proceeds to block 514 of process 500 of FIG. 5.

To maintain correct operation, a portion of the instruction flow logic 200 or code associated with processor 204 tracks operations of the L1 Icache. For example, whenever the L1 Icache is flushed, the predecode repair cache is also flushed. Also, whenever the L1 Icache is written to, the existing entries in the predecode repair cache are invalidated.

It is also noted, that as the width of the L1 Icache line decreases in a particular implementation, the size of the predecode repair cache would tend to increase, since the percentage of line crosser instructions would tend to increase. With an L1 Icache line of 160 bits, for example, two predecode repair cache lines may be sufficient for many applications.

The present invention is not limited to the illustrated instruction flow logic 200 and is further applicable to any pipeline processor having variable length instructions which stores predecode information in an instruction cache. Extensions to a variable length processor instruction set may be accommodated by the present invention if the extension supports a unique mode of instruction set use such that predecode information may be selectively controlled thereby saving write and read power. For example, a mode of operation may be specified where 16-bit, 32-bit, and 64-bit instructions are operative, such that 32-bit and 64-bit instructions may span across two L1 Icache lines. The processor using 64-bit instruction types may be an extension of the exemplary processor 204 described above. The extended processor could have operating mode states encoded for example for a first state restricted to only 32-bit instructions, a second state for both 16-bit and 32-bit instructions, a third state for 16-bit, 32-bit, and 64-bit instructions, and a fourth state restricted to only 64-bit instructions. A 64-bit instruction in an Icache line could be partitioned into four 20-bit fields, where each 20-bit field has a section of the 64-bit instruction and an associated Pd4 field. With 64-bit instructions in an L1 Icache line, the Pd4 fields associated with each of the 16-bit fields of the 64-bit instructions would be used for the whole 64-bit instruction.

The present invention is also not limited to instruction lengths that are power of two. For example, consider an alternative architecture that has 16-bit and 24-bit instructions. In this example, an instruction cache line may be partitioned into 8-bit instruction sections and 2-bit predecode sections. A 16-bit instruction could consist of 20-bits organized as {8-bits, 2-bits Pd2, 8-bits, 2-bits Pd2} for example. A 24-bit instruction could consist of 30-bits organized as {8-bits, 2-bits Pd2, 8-bits, 2-bits Pd2, 8-bits, 2-bits Pd2} for example. A 160-bit cache line storing 16-bit instructions would be able to hold eight 16-bit instructions organized as eight 20-bit sections for a total of 160-bits with all bits fully utilized. A 160-bit cache line storing 24-bit instructions would be able to hold five 24-bit instructions organized as five 30-bit sections for a total of 150-bits, with 10-bits remaining in the line that are not utilized.

While the present invention has been disclosed in a presently preferred context, it will be recognized that the present teachings may be adapted to a variety of contexts consistent with this disclosure and the claims that follow.

We claim:

1. A method of filling a predecode repair cache, the method comprising:
    determining that a first portion of an instruction is stored in a first cache line of an instruction cache and a second portion of the instruction is stored in a next cache line of the instruction cache, wherein the instruction has corresponding predecode information;
    in response to determining that the instruction spans the first cache line and the next cache line, generating repaired predecode information;
    storing the repaired predecode information at the predecode repair cache utilizing an address associated with the instruction; and
    selecting between the repaired predecode information stored at the predecode repair cache and the predecode information.

2. The method of claim 1, wherein the instruction cache is a level 1 instruction cache.

3. The method of claim 1 further comprising:
fetching the repaired predecode information from the predecode repair cache utilizing the address associated with the instruction.

4. The method of claim 1 wherein the first cache line holds instructions formatted in at least two different lengths.

5. The method of claim 1 wherein the predecode information is encoded in a first set of predecode bits associated with the first portion of the instruction and a second set of predecode bits associated with the second portion of the instruction, wherein the first set of predecode bits indicates that the instruction crosses a cache boundary line.

6. The method of claim 2 further comprising flushing the predecode repair cache whenever the level 1 instruction cache is flushed.

7. The method of claim 2 further comprising invalidating entries in the predecode repair cache whenever an entry is written to the level 1 instruction cache.

8. The method of claim 2, further comprising:
writing the first portion of the instruction and the second portion of the instruction into the predecode repair cache in response to generating the repaired predecode information:
selecting the first portion of the instruction and the second portion of the instruction from the predecode repair cache;
selecting the repaired predecode information from the predecode repair cache; and
aligning the first portion of the repaired predecode information with the first portion of the instruction and the second portion of the instruction to create a reassembled instruction with valid aligned predecode information.

9. The method of claim 1, wherein the predecode information is stored at the instruction cache.

10. A method of executing instructions, the method comprising:
fetching a first portion of an instruction that spans across two cache lines, the first portion of the instruction stored in a first cache line in an instruction cache, the instruction having corresponding predecode bits;
fetching repaired predecode information associated with the instruction from a predecode repair cache that is separate from the instruction cache, wherein the repaired predecode information is generated based on a determination that the first portion of the instruction is stored in the first cache line and a second portion of the instruction is stored in a next cache line;
fetching the second portion of the instruction stored in the next cache line following the first cache line, wherein fetching the second portion of the instruction includes selecting between the repaired predecode information stored at the predecode repair cache and the predecode bits; and
executing the instruction in response to the repaired predecode information.

11. The method of claim 10 further comprising combining the repaired predecode information with the first and second portions of the instruction that spans across two cache lines to create a reassembled instruction with valid aligned predecode information.

12. The method of claim 11 wherein the combining of the repaired predecode information with the first portion of the instruction and the second portion of the instruction further comprises:
selecting a first portion of the repaired predecode information and a second portion of the repaired predecode information;
selecting the first portion of the instruction and the second portion of the instruction from the instruction cache; and
aligning the first portion of the repaired predecode information and the second portion of the repaired predecode information with the first portion of the instruction and the second portion of the instruction to create the reassembled instruction with the valid aligned predecode information.

13. The method of claim 10 wherein the first portion of the instruction comprises a first set of instruction bits and an associated first set of the predecode bits and the second portion of the instruction comprises a second set of instruction bits and an associated second set of the predecode bits.

14. The method of claim 13 further comprising:
predecoding the first set of instruction bits to form a first set of repaired predecode bits; and
predecoding the second set of instruction bits to form a second set of repaired predecode bits.

15. The method of claim 14 further comprising:
selecting the first set of repaired predecode bits in place of the first set of predecode bits;
selecting the second set of repaired predecode bits in place of the second set of predecode bits; and
bypassing a processor predecoder stage in response to having generated the repaired predecode information.

16. An apparatus for utilizing a predecode repair cache, the apparatus comprising:
an instruction cache operable to store instructions having at least a first length and a second length in an instruction cache line, the second length being longer than the first length, wherein the instruction has corresponding predecode information;
a predecoder operable to predecode an instruction fetched from the instruction cache to form repaired predecode information based on a determination that a first portion of the instruction is stored in a first cache line of the instruction cache and a second portion of the instruction is stored in a next cache line of the instruction cache;
a predecode repair cache operable to store the repaired predecode information associated with the instruction; and
control logic operable to select between the repaired predecode information stored at the predecode repair cache and the predecode information.

17. The apparatus of claim 16 further comprising a combiner operable to combine the repaired predecode information fetched from the predecode repair cache with the first portion of the instruction and the second portion of the instruction to create a reassembled instruction with valid aligned predecode information.

18. The apparatus of claim 16 further comprising a bypass path around the predecoder operable to bypass the predecoder for instructions fetched from the instruction cache that have valid predecode information.

19. The apparatus of claim 17 wherein the combiner comprises:
a multiplexer including the control logic and operable to select a first portion and a second portion of the repaired predecode information fetched from the predecode repair cache utilizing an address associated with the instruction and to select the first portion of the instruction and the second portion of the instruction; and
alignment logic operable to combine the first portion of the repaired predecode information with the first portion of the instruction and combine the second portion of the repaired predecode information with the second portion of the instruction.

20. The apparatus of claim 18, wherein the bypass path around the predecoder is selected when the repaired predecode information is valid.

21. The apparatus of claim 16, further comprising:
a fill buffer coupled to the instruction cache, wherein the fill buffer is configured to provide elastic storage in response to a processor latency; and
a second cache coupled to a second predecoder, wherein the second predecoder is coupled to the fill buffer.

* * * * *